(No Model.) 5 Sheets—Sheet 3.
O. W. ALLISON.
CIGARETTE MACHINE.
No. 406,610. Patented July 9, 1889.
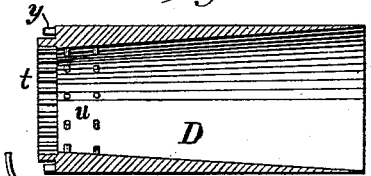
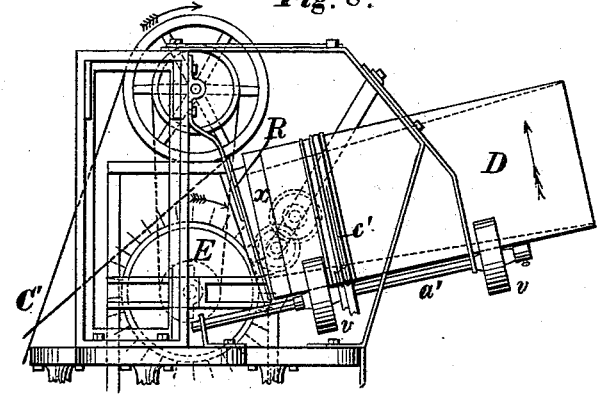
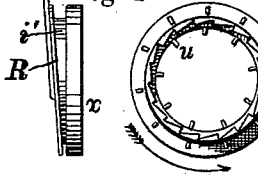
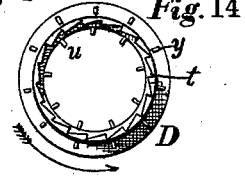
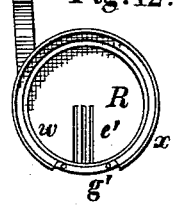
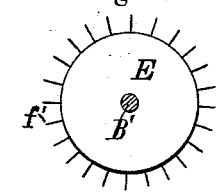
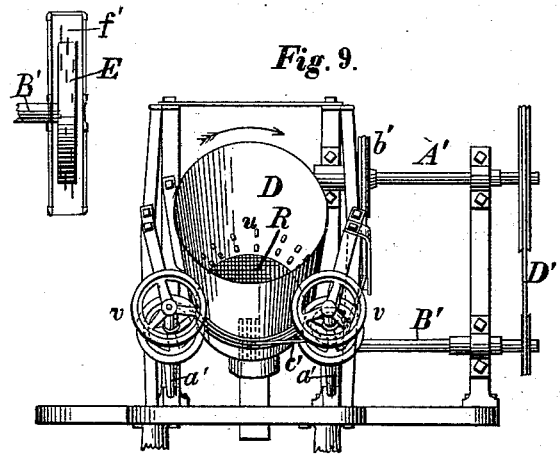
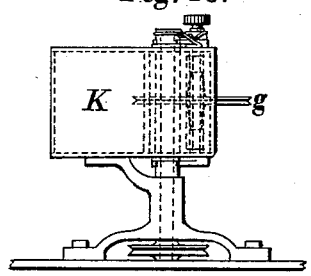
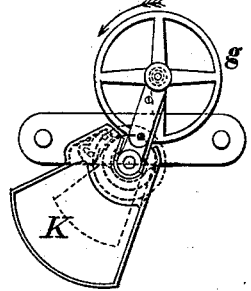
WITNESSES
D. Denniston
H. G. Phillips
INVENTOR
Oscar W. Allison
by Geo. B. Selden,
Attorney (No Model.) 5 Sheets—Sheet 4.
O. W. ALLISON.
CIGARETTE MACHINE.
No. 406,610. Patented July 9, 1889.
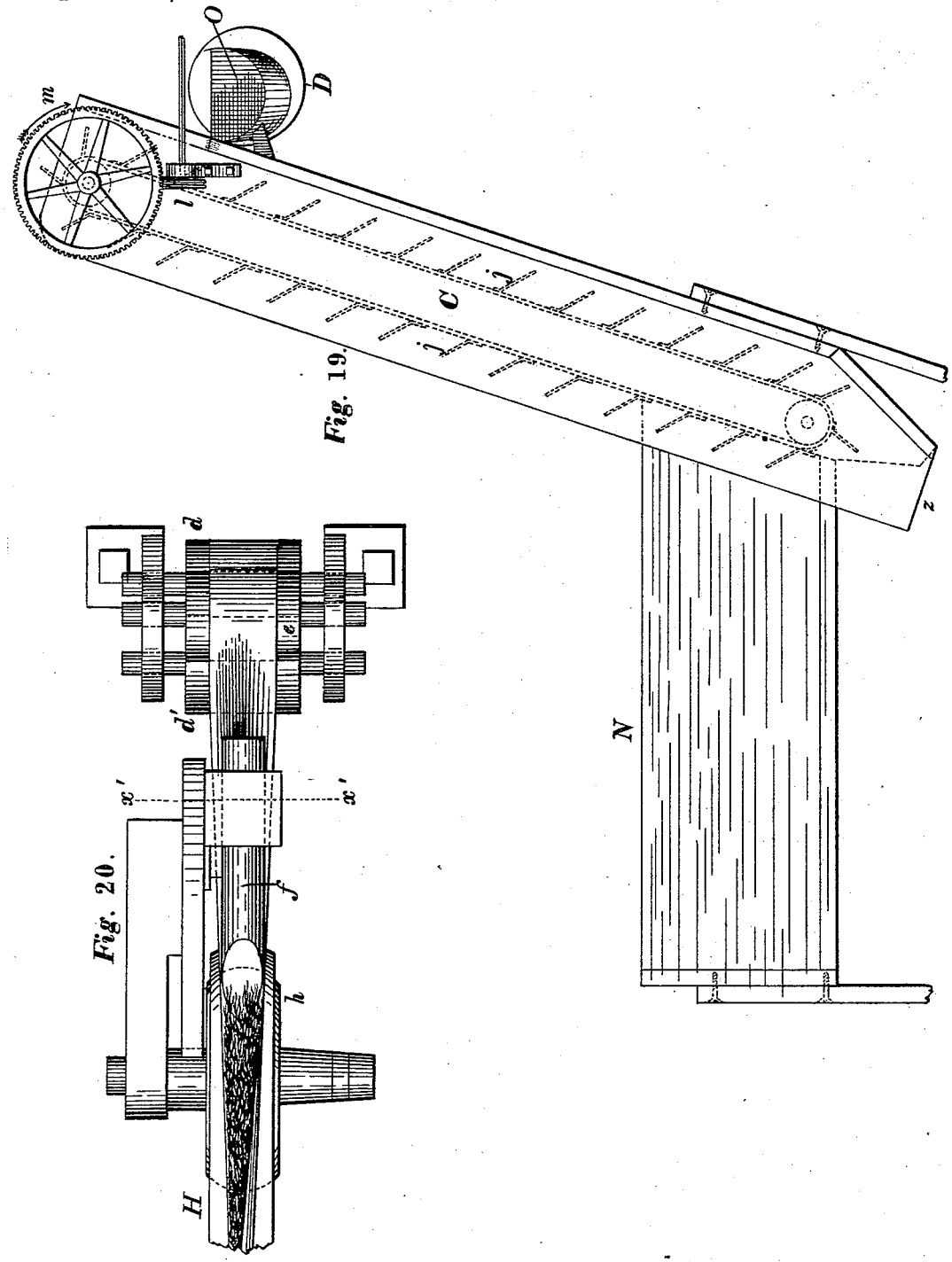
WITNESSES
D. Dennistoun.
H. G. Phillips.
INVENTOR
Oscar W. Allison,
by Geo. B. Selden,
Attorney (No Model.) 5 Sheets—Sheet 5.
O. W. ALLISON.
CIGARETTE MACHINE.
No. 406,610. Patented July 9, 1889.
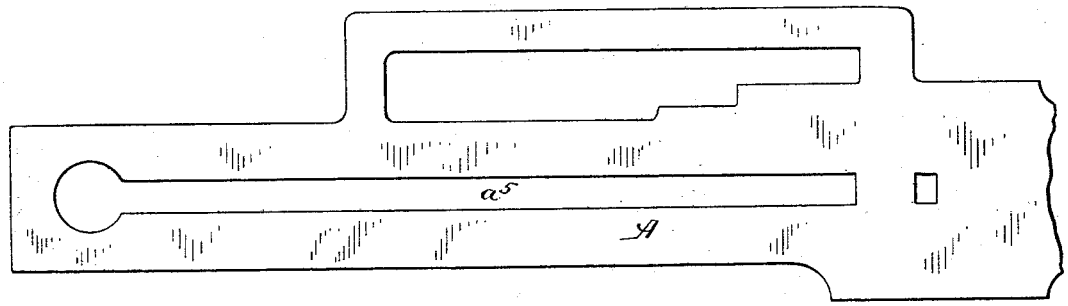
Fig. 21.
Fig. 22.
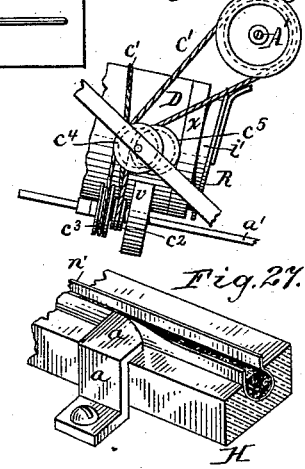
Fig. 24.
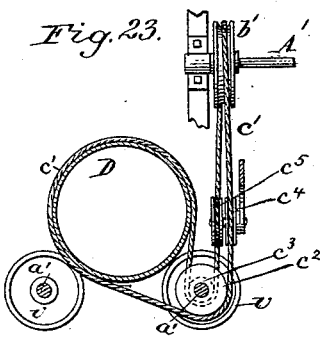
Fig. 23.
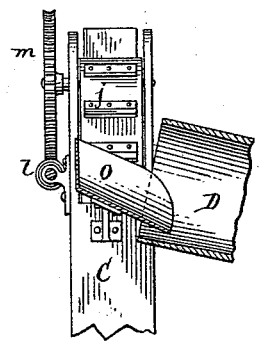
Fig. 25.
Fig. 27.
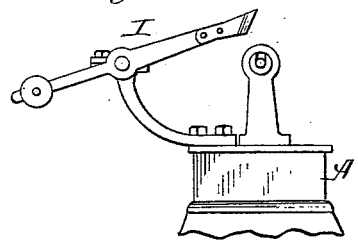
Fig. 26.
Witnesses: Chas J Buchheit, Geo J Buchheit Jr.
O. W. Allison, Inventor
By Wilhelm Bonner, Attorneys.

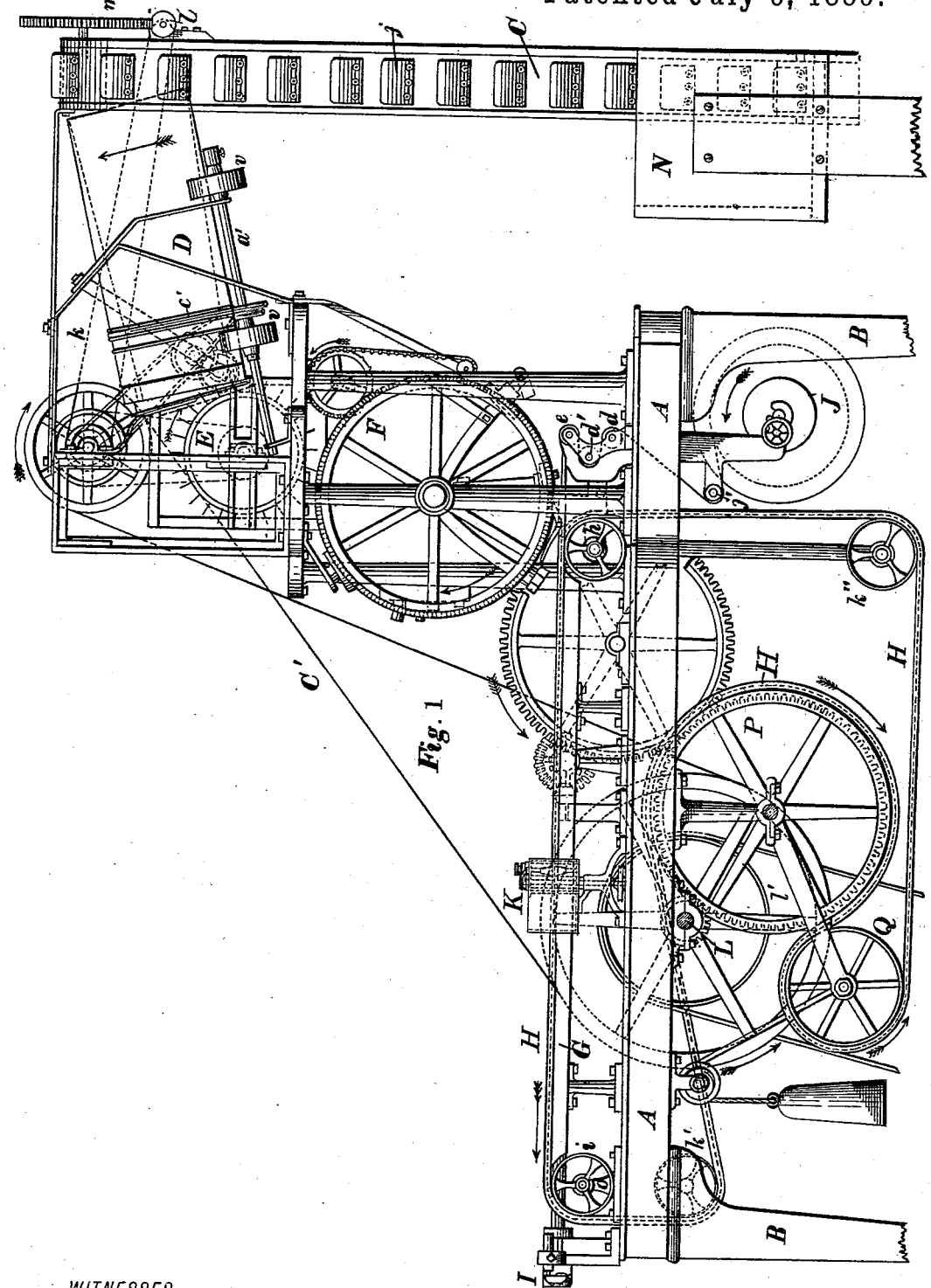

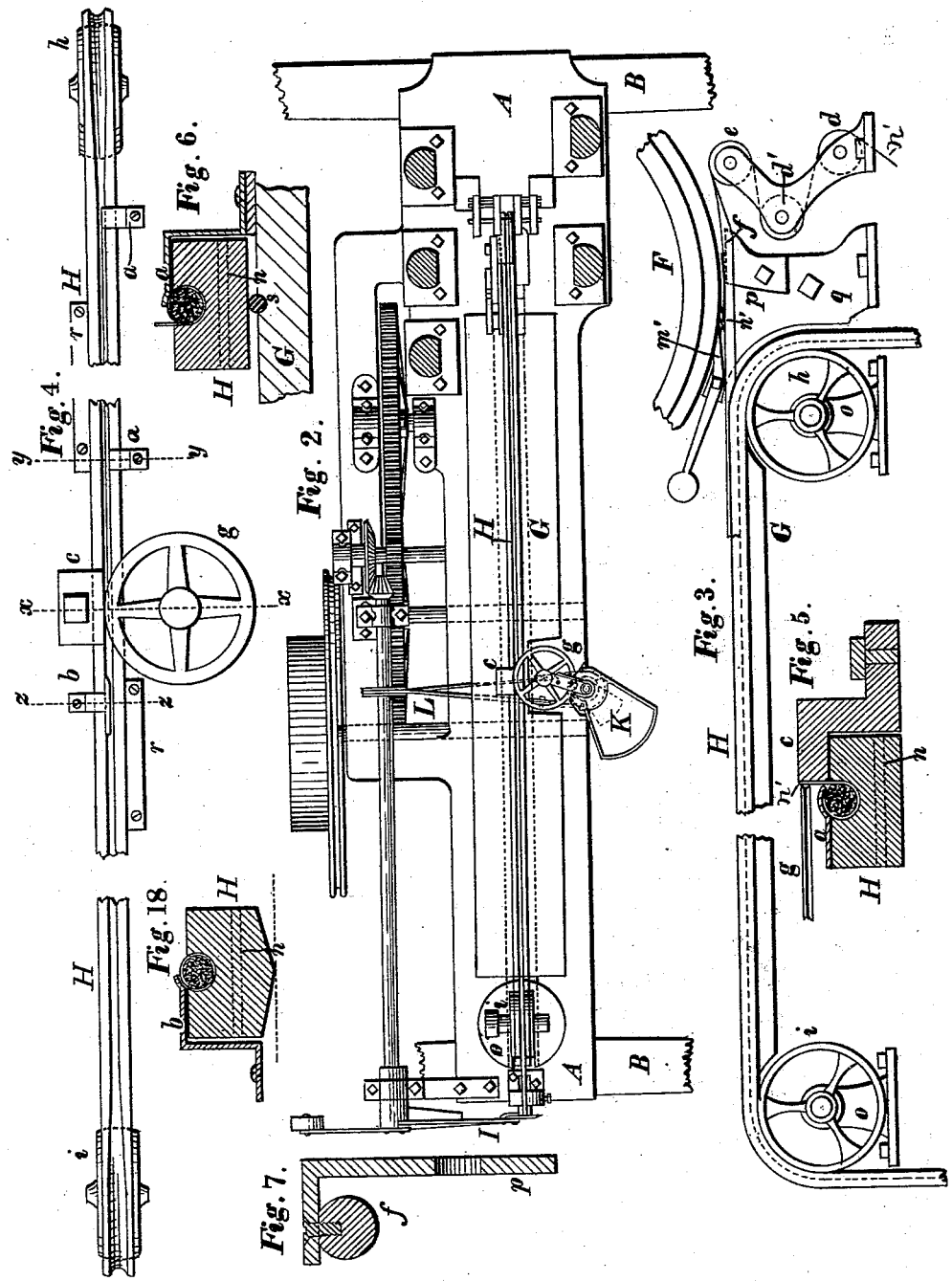

UNITED STATES PATENT OFFICE.

OSCAR W. ALLISON, OF ROCHESTER, NEW YORK.

CIGARETTE-MACHINE.

SPECIFICATION forming part of Letters Patent No. 406,610, dated July 9, 1889.

Application filed November 10, 1885. Serial No. 182,362. (No model.)

*To all whom it may concern:*

Be it known that I, OSCAR W. ALLISON, of Rochester, New York, have invented certain Improvements in Cigarette-Machines, of which the following is a specification, reference being had to the accompanying drawings.

My present invention relates to certain improvements in that class of cigarette-machines by which the tobacco is formed into a continuous filler or rod, which is delivered upon a continuous web of paper, the latter being gummed along one edge, then c'osed upon the filler, and the continuous cigarette so formed cut into suitable lengths.

My improvements are fully described in the following specification, and the novel features thereof specified in the annexed claims.

My present improvements in cigarette-machines are represented in the accompanying five sheets of drawings, in which—

Figure 1 is a side elevation of my improved machine. Fig. 2 is a plan view. Fig. 3 is a partial side elevation. Fig. 4 is a plan view of the flexible grooved band which finishes the cigarette-rod, showing, also, its supporting-pulleys and the pasting-wheel, paper-support, and paper-folders. Fig. 5 is a transverse section through the flexible grooved cigarette-finishing band on the line $x\,x$, Fig. 4. Fig. 6 is a section on the line $y\,y$, Fig. 4. Fig. 7 is a section through the paper-former and its supporting-arm. Fig. 8 is a side elevation of the feeding mechanism detached. Fig. 9 is an end elevation of the feeding mechanism detached as seen from the right hand in Fig. 8. Fig. 10 is a side elevation of the rotary picker. Fig. 11 is a front elevation of the same. Fig. 12 represents the slotted plate at the inner end of the feed-cylinder. Fig. 13 is a side elevation of the same. Fig. 14 is an end elevation of the rotary feed-cylinder. Fig. 15 is a central longitudinal section of the same. Fig. 16 is an end elevation of the paste-pot. Fig. 17 is a plan view of the same. Fig. 18 is a section on line $z\,z$, Fig. 4. Fig. 19 is a side elevation of the tobacco-elevator. Fig. 20 is a plan view, on an enlarged scale, of a portion of the cigarette-finishing band and the paper-former. Fig. 21 is a top plan view of the bed-frame of the machine. Fig. 22 is a top plan view of the table. Fig. 23 is a cross-section showing the devices by which the feed-cylinder is rotated. Fig. 24 is a side elevation thereof. Fig. 25 is a front view, partly in section, of the tobacco-elevator, feeding-cylinder, and connecting parts. Fig. 26 is an end elevation of the bed-frame and cutter mechanism. Fig. 27 is a perspective view of a paper-folder $a$.

Like letters of reference refer to like parts in the several figures.

In the accompanying drawings, representing my improvements in cigarette-machines, A is the base or bed of the machine, which is supported at a suitable height by the legs B B and sustains the operative parts of the machine.

C is a tobacco-elevator or elevating-belt by which the tobacco is carried to the rotary feeding-cylinder D, from which it is delivered to the rotary picker E and the compressing-rings F, by which the tobacco is formed into a continuous filler or rod.

G is a table or other suitable support, which supports the grooved cigarette-finishing band H, which receives the formed and compressed tobacco rod or filler from the compressing-rings F, and which rod is inclosed or wrapped within a continuous web of paper, and finally delivered, after the application of a suitable paste or gum to one edge of the paper, to the cutting-off mechanism I.

J is the bobbin from which the paper web is delivered to the band H, around two rolls $d'\,e$, and underneath the paper-former $f$.

K is the paste-pot, which supplies paste to the paste-wheel $g$, by which it is applied to one edge of the continuous web of paper, which passes between the wheel $g$ and the paper-support $c$.

Power is applied to the main driving-shaft L, from which it is transmitted to the various working parts of the machine by means of belts or gearing.

N, Figs. 1 and 19, is a feed-box, in which a quantity of tobacco is stored and from which the operator supplies it to the machine by placing it in small quantities at a time on the shelves or ledges $j\,j$ of the elevator C. The elevator-belt is arranged to travel at a slow speed within the walls of a casing, which is preferably inclined, as shown in Fig. 19, so as to facilitate the delivery of the tobacco at its upper end into the spout O, from which it passes down inside the rotary feeding-cylinder D. The elevator-belt runs over suitable pulleys at the top and bottom, being driven from any convenient part of the machine by the belt $k$, Fig. 1, worm $l$, and gear $m$. The shelves $j$ of the elevator incline outward at an angle for the purpose of insuring the delivery of the tobacco into the spout O.

The casing of the elevator is left open at its lower end below the feed-box N, so that any shorts or fine tobacco falling down the elevator may be discharged at $z$, Fig. 19, into a suitable receptacle, thereby preventing the clogging of the elevator-belt.

The feeding mechanism in my improved cigarette-machine consists of the revolving cylinder D, slotted plate R, and rotary toothed picker E. The revolving feeding-cylinder is supported and arranged to rotate on the rollers $v\ v$, mounted on the shafts $a'\ a'$, journaled in bearings in a suitable frame-work attached to the machine. A continuous revolving motion is given to the feeding-cylinder D by a round belt $c'$, running over suitable guide-pulleys $c^2\ c^3\ c^4\ c^5$, Figs. 23 and 24, and receiving motion from the pulley $b'$ on the shaft A'. The belt $c'$ passes around the exterior of the cylinder D, on which a groove is formed to hold it in place thereon. As represented in the sectional view, Fig. 15, the revolving cylinder D is made of conical or tapering form.

Toward the delivery end of the revolving cylinder I insert a row of pins $u$, Figs. 9 and 15, which operate, when the cylinder is revolving, to stir up the tobacco and to present it through the slots $e'$ in the stationary plate R, which closes the delivery end of the revolving cylinder. The rotary picker E is provided with one or more rows of teeth $f'$, which pass through the slot or slots $e'$, Fig. 12, in the stationary plate R, and serve to extract the tobacco from the feeding-cylinder in a continuous stream and to deliver it to the compressing-rings F.

In Fig. 12 I have represented the stationary plate R as detached from the feeding-cylinder, and on inspection thereof, in connection with Fig. 13, it will be seen that the plate is provided with two projecting rings having an annular space between them, the outside ring $x$ being cut away at its lower part, as indicated at $g'$ in the said figure. The end of the cylinder D is provided with one or more projecting pins $y$, which, as the cylinder revolves, travel through the annular groove between the inner ring $w$ and the outer ring $x$ and serve to discharge any fine tobacco or shorts through the opening $g'$. It will also be perceived that the plate R is placed at an angle with the axis of the revolving feeding-cylinder D, thereby facilitating the extraction of the tobacco from the interior of the cylinder by the teeth of the revolving picker E and facilitating its discharge downward through the case which surrounds the picker to the compressing-rings F. The stationary plate R is connected to the rings $w$ and $x$ by means of a short tube or cylinder $i'$, Fig. 13.

The delivery end of the revolving feeding-cylinder is provided with an annular row of internal teeth $t$, Figs. 14 and 15, which are employed for the purpose of preventing the accumulation of tobacco at the point where the end of the cylinder comes nearest to the angularly-placed plate R. The teeth $t$ are constructed with abrupt front sides and inclined backs, and carry the fine tobacco up and mix it with the long tobacco passing through the discharge end of the cylinder. The pins $y$ are formed on the discharge end of the cylinder D, outside of the teeth $t$, and project forwardly into the annular space between the rings $w$ and $x$, in which space they rotate and which space they keep clear from accumulations of short tobacco, as described. The picker E is mounted on a shaft B', Fig. 9, which is journaled in suitable bearings on the frame-work of the machine, and is rotated in any convenient manner from any moving part of the machine—for instance, as indicated in the drawings, by means of the belts C' and D'.

F represents compressing-rings or a continuous tobacco-rod-forming device, such as is fully shown and described in my application, Serial No. 284,988, filed September 8, 1888. No specific claim is made to this particular device in this application, and it is obvious that any other suitable tobacco-rod-forming mechanism may be used in connection with the invention herein described and claimed. It will be understood, however, that the tobacco is distributed by the rotary picker E onto the rod forming or compressing rings F, which are so operated as to form the tobacco into a continuous rod or filler, and that the continuous rod is discharged from the filler-forming rings F onto the paper at $n'$, Fig. 3, a scraper $m'$ being arranged in connection with the rings for this purpose.

The continuous filler issuing from the compressing-rings F is inclosed in the continuous web of paper by mechanism which consists, essentially, of a paper-bobbin J, suitable guiding-rolls $j'$, $d$, $d'$, and $e$, the paper-former $f$ and the endless flexible grooved drawing-band H. The endless flexible grooved band H is arranged to travel along the upper surface of a table or support G, around the pulleys $h$ and $i$, arranged at opposite ends of the table, and around suitable guide-pulleys $k'\ k^2$, Fig. 1, deriving its motion from the driving-pulley P, and being maintained in a state of tension by the tightener-pulley Q. The driving-pulley P receives its motion from the pinion on the main driving-shaft L, the arrangement being such that the band H travels at the same speed with the rings F. The tightener-pulley Q is supported by a swinging frame $l'$, pivoted on the shaft of the driving-pulley P, and is thrown upward by a spring or by a weight and cord running over a guide-pulley, as indicated in Fig. 1, so as to maintain the band H in a constant state of tension.

In Figs. 5, 6, and 18 I have represented the band H in section, and it will be observed that it is strengthened or prevented from stretching lengthwise by the layer or layers n, of cloth or any suitable fabric, which are applied to its lower side, or, rather, preferably vulcanized into the body of the band at the time of its formation. As indicated in the said figures, the band H has in its outer side a longitudinal groove of a width equal to the thickness of the cigarettes which the machine is designed to make, and of a depth preferably somewhat less than the diameter of the said cigarette-rod. In order to distend the groove in the band laterally, at the point where the tobacco filler and the paper are introduced into it and at the point where the finished cigarette is discharged therefrom, I make the faces of the pulleys h and i strongly convex, (see Figs. 4 and 20,) either rounded, as shown, or angle-shaped transversely, so that the crowns or ridges of the pulleys are considerably larger in diameter than the edges of their faces, the result of which is that at the points where the band passes over these pulleys, the groove in it is first distended, so as to permit the introduction of the filler and the paper, and then again to discharge the finished cigarette. This operation will be readily understood from an inspection of Figs. 4 and 20 of the drawings hereto annexed. The same result may, however, be accomplished by using as an equivalent device a straight-faced pulley, provided the inner face of the band is made convex or ridge-shaped transversely, as indicated in Fig. 18 of the drawings. This construction also serves to increase the flexibility of the band while passing over the table G, and its capacity to adapt itself to slight variations in the diameter or character of the continuous cigarette-rod. This last-named result of increasing the pliability of the band while passing over the table may, however, be accomplished with a band having a flat back by arranging a rib, rod, or wire s, lengthwise on the table G, immediately below the center of the band, as represented in Figs. 6 and 22, the effect of which is to permit a slight amount of bending or yielding in the band. The paper passes from the bobbin J around the guide-pulley j', and thence around the guide pulleys or rolls d, d', and e, from the latter of which it is delivered against the under side of the paper-former f, by which its edges are bent upward, so as to adapt it to enter the groove in the band H, Figs. 7 and 20. A stationary guide may be used in place of the guide-roll e as an equivalent; but I prefer to use the roll in order to reduce the friction, and, while both the guide-rolls d d' are not essential to the operation of the machine, I prefer to arrange them so that the web of paper is compelled to pass around them in a manner substantially as indicated in Fig. 3. Suitable side guides r r are attached to the upper surface of the table G to bear against the edges of the band H, in order to cause the same to travel in a straight line and in proper relation with the other parts of the machine. One edge of the paper is first folded down over the top of the tobacco rod or filler in the groove of the band by means of a folder or folders a. (Shown in Figs. 4, 5, and 27.) The folder a is supported in place on the table G, and projects with its upper portion partly across the groove in the band H. Paste is applied to the interior side of the other edge of the paper web by means of the paste-wheel g, the paper being supported during this operation by means of the paper-supporter c, Figs. 4 and 5. The pasted edge of the paper web is then folded down upon the edge first folded down by the folder or folders a, and caused to adhere to the other edge by means of the folder b, which is shown in Figs. 4 and 18. The second folder b is constructed substantially like the first folder or folders a, except that it is placed on the opposite side of the band H.

As indicated in the drawings, the edge of the paste-wheel g is grooved, and paste is supplied to it from the paste-pot K by means of a roller arranged to revolve at the inner edge of the paste-pot and to be driven from any of the moving parts of the machine in any suitable manner. The arrangement is such that the paste-wheel g is caused to revolve by the paste-supply roll at the same speed with which the band H travels. The table G is provided on one side with a notch, as represented in Fig. 22, which permits the application of the paste apparatus.

In order to adapt the machine to the use of the endless band H, the frame A is provided with a longitudinal slot $a^5$, (represented in Fig. 21,) which permits of the insertion and removal of the band. The pulleys h and i are carried by suitable supports o o, removably attached to the frame A. The table G and guide-pulleys k' k'', Fig. 1, are also secured removably to the frame, so that the band H may be taken off and a new one substituted for it, when necessary, without delay.

The paper-former f is supported on a bracket q, to which it is attached by means of an arm or lug p. The bracket q also serves to support the scraper m', which is pivoted thereto, as indicated in Fig. 3.

I prefer to form the band H of vulcanized india-rubber, in one piece, with a groove in its outer surface, and with a layer or layers of cloth or other fabric n embedded therein; but it is obvious that it may be made of any suitable flexible material. The band H serves to draw and finish the continuous cigarette, presenting it first to the folder or folders a, then to the paste mechanism, then to the folder b, and, finally, to the cutter mechanism. By the use of the flexible grooved cigarette-finishing band having a continuous groove capable of being distended in its outer surface, and means for distending it, I am enabled to make cigarettes of the most uniform character at a high rate of speed and with great freedom from waste.

It is obvious that any suitable folding or pasting mechanism may be employed instead of the particular one described and shown.

The cutting mechanism I consists of a revolving arm provided with a knife, which severs the cigarette-rod into suitable lengths while passing over a suitable support.

It is obvious that the filler and paper drawing and forming mechanism herein described may be used in connection with any suitable tobacco-feeding or filler-forming devices, and that various modifications may be made in the arrangement or construction of the paper-former, the folders, and the pasting apparatus, while still retaining the flexible grooved band and devices for distending the groove therein, so as to freely receive the paper and filler and deliver the finished cigarette therefrom.

I claim as my invention—

1. The combination, with the endless flexible band provided in its face with a continuous longitudinal groove, of a device so constructed as to distend the continuous groove in the band, substantially as set forth.

2. The combination, with the endless flexible band provided in its face with a continuous longitudinal groove, of a carrying-pulley provided with a raised ridge over which the band passes and whereby the band is bent transversely, thereby distending the groove, substantially as set forth.

3. The combination, with the endless flexible band provided in its face with a continuous longitudinal groove, of carrying-pulleys provided with raised ridges whereby the band is bent transversely and its groove is distended, and a supporting-table arranged between said pulleys, upon which table the band is carried in its normal straight form, substantially as set forth.

4. The combination, with suitable tobacco-feeding mechanism, of paper-supply rollers, the endless flexible band provided in its face with a continuous longitudinal groove, and a distending device whereby the band is bent transversely to distend its groove for receiving the paper and filler, substantially as set forth.

5. The combination, with the endless flexible band provided in its face with a continuous longitudinal groove and a device for distending the groove in the band, of the paper-supply rollers and the paper-former arranged between the supply-rollers and the grooved belt, substantially as set forth.

6. The combination, with the endless flexible band provided in its face with the continuous longitudinal groove and a device for distending the groove in the band, of the paper-former $f$, arranged to act on the paper before it passes into the distended groove, a paper-supply roll, and suitable paper-guide rolls arranged between the supply-roller and the paper-former, substantially as set forth.

7. The combination, with the feed-box N, of the elevator C, having its casing open at the bottom below the feed-box, substantially as described.

8. The combination, with the rotary feeding-cylinder D, of the slotted stationary plate R and the rotary toothed picker E, the teeth of which operate in the slot or slots of the plate, substantially as described.

9. The combination, with the rotary feeding-cylinder D, stationary slotted plate R, and toothed picker E, working in the slot or slots of the plate R, of the revolving supports $v\ v$, substantially as described.

10. The combination, with the rotary feeding-cylinder provided with internal pins $u$, of the stationary slotted plate R and the rotary picker-wheel E, working in the slot or slots of the plate R, substantially as set forth.

11. The combination, with the stationary slotted plate R, provided with rings $w$ and $x$, the latter being cut away at $g'$, of the rotary feeding-cylinder D, having one or more pins $y$, adapted to revolve in the annular groove between the said rings, substantially as described.

12. The combination, with the rotary feeding-cylinder D, of the slotted plate R, arranged at an angle with the axis of the cylinder, and the rotary toothed picker E, having teeth working in the slot or slots of the plate, substantially as described.

OSCAR W. ALLISON.

Witnesses:
GEO. B. SELDEN,
H. G. PHILLIPS.